United States Patent [19]
Goodwin, Jr.

[11] 4,357,752
[45] Nov. 9, 1982

[54] SPRINKLER HEAD GRASS CLIPPER

[76] Inventor: Walter E. Goodwin, Jr., 1725 Trinity Loop, Ontario, Calif. 91764

[21] Appl. No.: 216,157

[22] Filed: Dec. 15, 1980

[51] Int. Cl.³ .......................................... A01D 55/18
[52] U.S. Cl. ...................................... 30/122; 30/276; 30/302
[58] Field of Search ................. 30/122, 316, 301, 302, 30/276

[56] References Cited

U.S. PATENT DOCUMENTS

| | | | |
|---|---|---|---|
| 1,891,854 | 12/1932 | Wade . | |
| 2,740,248 | 4/1956 | Pickens | 56/229 |
| 2,924,929 | 2/1960 | Albertson et al. | 56/25.4 |
| 2,953,852 | 9/1960 | Dehn | 30/276 X |
| 3,028,669 | 4/1962 | Caskey et al. | 30/276 |
| 3,040,990 | 6/1962 | Gotti | 239/273 |
| 3,087,295 | 4/1963 | Grupp | 56/25.4 |
| 3,143,176 | 8/1964 | Drane, Jr. | 30/316 |
| 3,174,224 | 3/1965 | Rousselet | 30/276 X |
| 3,214,893 | 2/1965 | Griffin | 56/25.4 |
| 3,657,814 | 4/1972 | Bohlman | 30/302 |
| 3,982,697 | 9/1976 | Maples | 239/289 |
| 4,022,283 | 5/1977 | Morgan | 30/276 X |
| 4,062,115 | 12/1977 | Lee | 30/276 |

*Primary Examiner*—Frank T. Yost
*Attorney, Agent, or Firm*—Fulwider, Patton, Rieber, Lee & Utecht

[57] ABSTRACT

A sprinkler head grass clipper for coupling to a lawn trimmer, and particularly a lawn trimmer of the type which clips grass by means of a rapidly whirling flexible line. The clipper includes a body adapted for attachment to the lawn trimmer rotor and configured to fit over and engage a sprinkler head to maintain the body in a predetermined clipping position during rotation of the rotor. One or more cutting elements are carried by the body for clipping the grass adjacent the sprinkler head upon rotation of the rotor.

10 Claims, 6 Drawing Figures

U.S. Patent    Nov. 9, 1982    4,357,752
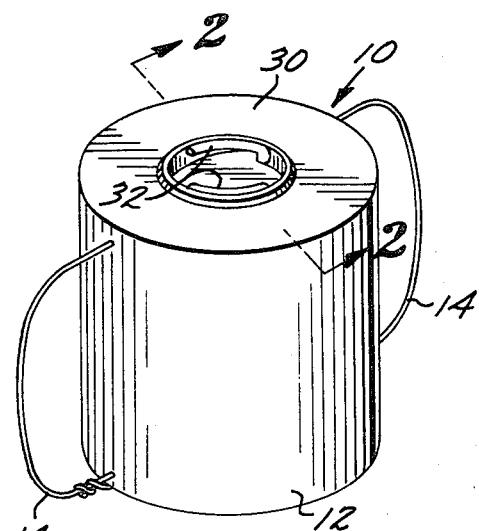
FIG.1
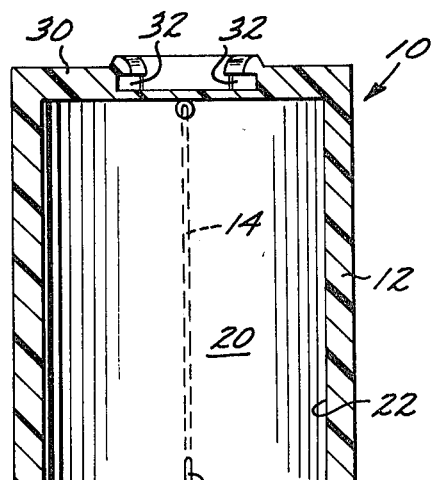
FIG.2
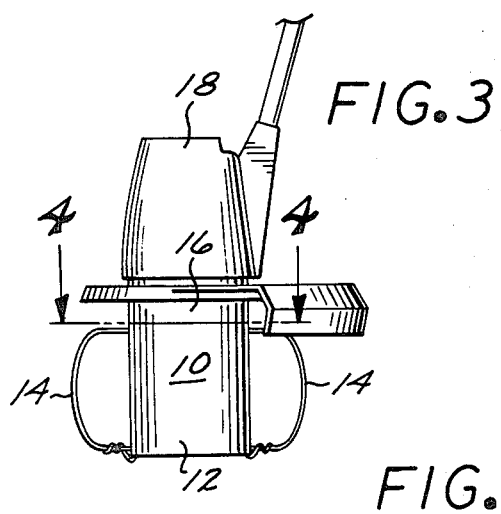
FIG.3
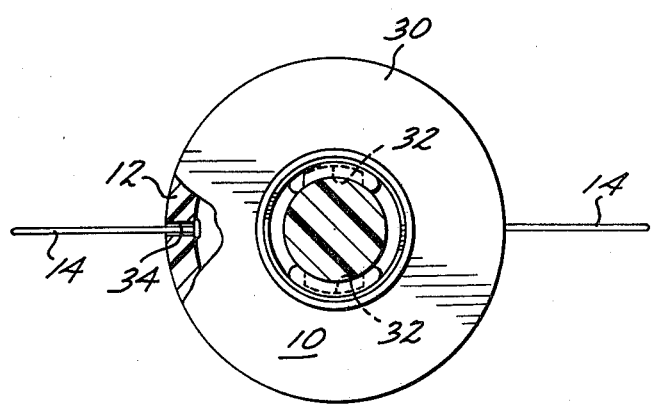
FIG.5    FIG.4
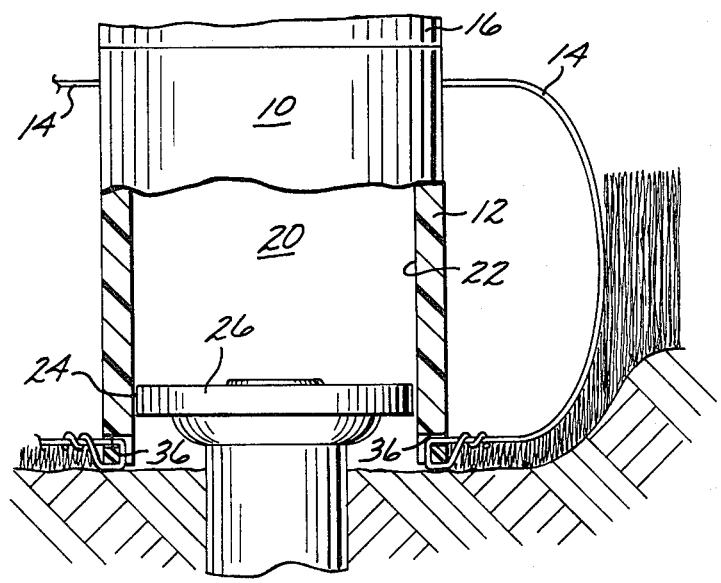
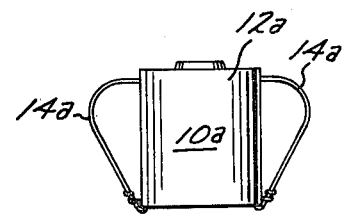
FIG.6

SPRINKLER HEAD GRASS CLIPPER

BACKGROUND OF THE INVENTION

1. Field of the Invention

The present invention relates to a grass clipper and particularly a grass clipper adapted for trimming the grass around a sprinkler head.

2. Description of the Prior Art

The usual circular lawn watering sprinkler head projects slightly above ground level to provide a good water spray pattern, but not enough to interfere with passage of a lawn mower across the head. In time grass growing over the sprinkler head interferes with the water spray pattern. This grass is too low for the lawn mower to reach and is trimmed away in a tedious hand operation. To avoid this some gardeners surround the head with an unsightly annular plastic shield to discourage grass growth in the immediate area of the sprinkler head. Also, some sprinkler heads are of the "pop-up" type in which the spray element is raised by water pressure to project above the main body of the head. However, the operation of even this type of sprinkler is eventually adversely affected by grass intrusion.

Various specialized devices have been advanced for trimming grass that cannot be reached by the usual lawn mower. These include a lawn edger, which employs a whirling blade whose cutting plane can be adjusted between vertical and substantially horizontal, and also "fish-line" trimmers which whirl a flexible plastic line at high speed to trim grass located close to buildings and the like. However, these and other types of lawn trimmers are unable to quickly and efficiently reach the low lying grass which grows across and interferes with the operation of a sprinkler head.

SUMMARY OF THE INVENTION

According to the present invention, a sprinkler head grass clipper is provided which is adapted for coupling to a power driven lawn trimmer rotor. The lawn trimmer can be any trimmer or like apparatus adapted to operate a rotor at a relatively high rate of rotation. One preferred type of lawn trimmer is the so-called "fish-line" trimmer which employs a reel detachably mounted to a rotor. The reel carries a coiled flexible line, a suitable length of such line being unwound from the reel so that upon rotation of the rotor and reel, the line will whip against and clip adjacent grass.

The present clipper includes a body which can be quickly substituted for the fish-line trimmer reel. The body includes a downwardly open recess defined by a cylindrical wall which is adapted to slidably bear against the periphery of the sprinkler head to maintain the body in a predetermined clipping position during rotation of the lawn trimmer rotor. The body mounts cutting means which project outwardly of the body to clip grass adjacent the sprinkler head upon rotation of the rotor in one embodiment, the cutting means comprises a pair of wires extending between top and bottom portions of the body, and the wire configuration is such that the wires project to a progressively greater degree in an upward direction. Consequently, the area of the grass clipped by the wires increases as the body is moved downwardly relative to the sprinkler head.

In order to clip grass adjacent sprinkler heads it is only necessary to substitute the clipper body for the fish-line reel and place the clipper body over the reel. The rotating cutter elements of the clipper body quickly and easily trim such grass.

Other objects and features of the invention will become apparent from consideration of the following description taken in connection with the accompanying drawings.

BRIEF DESCRIPTION OF THE DRAWINGS

FIG. 1 is a perspective view of a sprinkler head grass clipper according to the present invention;

FIG. 2 is an enlarged view taken along the line 2—2 of FIG. 1;

FIG. 3 is a side elevational view of the clipper of FIG. 1 attached to the rotor of a fish-line type of lawn trimmer;

FIG. 4 is an enlarged view taken along the line 4—4 of FIG. 3;

FIG. 5 is an elevational view of the present sprinkler head grass clipper, partially in section, and illustrating the relationship between the clipper and a sprinkler head in the clipping position of the clipper; and FIG. 6 is a side elevational view of a modified form of sprinkler head grass clipper in which the cutting wires are specially configured to clip a progressively greater grass area as the clipper is moved downwardly relative to the sprinkler head.

DESCRIPTION OF THE PREFERRED EMBODIMENTS

Referring now to the drawings, and particularly to FIGS. 1 through 5, there is illustrated a sprinkler head grass clipper 10 according to the present invention and comprising, generally, a cylindrical body 12 mounting cutting means which preferably take the form of a plurality of cutter wires 14, and adapted for attachment to the rotor 16 of a lawn trimmer 18.

Although the body 12 can be made of metal, it is preferably made of a molded plastic material such as polyethylene or nylon for ease of fabrication and cost reduction. In addition, the relatively soft plastic material avoids abrading the brass of which most sprinkler heads are made.

The body 12 is characterized by a downwardly open recess 20, as best seen in FIG. 5, defined by a cylindrical wall 22 adapted to slidably bear against the periphery 24 of a usual and conventional circular sprinkler head 26. The body 12 is adapted for rotation about a vertical axis generally coincident with the vertical axis of the sprinkler head 26 in the clipping position of the clipper 10 which is illustrated in FIG. 5.

Although the present clipper 10 can be adapted for coupling to the rotor of any garden or like appliance for rotation of the body 12, the body 12 is preferably configured for attachment to the rotor 16 of a lawn trimmer 18 of the so-called "fish-line" type, in which a reel (not shown) is detachably mounted to the rotor 16. The reel carries a coil of flexible plastic line, and a length of this line is deployed for rapid whirling and cutting of lawn adjacent the trimmer 18, as is well knwon to those skilled in the art.

The upper portion of the line reel is configured to provide a means for its attachment to the trimmer rotor. This configuration is duplicated in the upper wall 22 of the body 12 so that the body 12 can be similarly detachably mounted to the rotor 16 once the line reel is detached. This permits the user to quickly change from a trimming operation using the trimmer reel to a sprinkler head grass clipping operation using the body 12.

Detachable mounting of the body 12 is enabled by provision of a shallow recess formed in part by a cylindrical wall 30 molded or otherwise configured to include a pair of diametrically opposed camming detents 32 adapted to slidably receive complemental cam lobes (not shown) which are molded integral with the underside of the rotor 16.

The rotor cam lobes and camming detents 32 constitute locking means whereby the body 12 can be quickly mounted to the rotor 16 by locating the rotor lobes out of registry with the camming detents 32 and thereafter rotating the body 12 a quarter turn in a clockwise direction, as seen in FIG. 1.

The inner surface of the wall 22 defining the recess 20 is adapted to closely receive the circular sprinkler head 26. A difference in diameters of approximately one-half inch has been found to provide sufficient clearance for proper operation. The vertical height of the recess 20 can be made to suit the particular application involved. A greater height permits the body recess 20 to accommodate sprinkler heads projecting a significant distance above ground level.

A relatively shallow recess 20 provides a more compact clipper 10.

The pair of cutter wires 14 each includes an upper upset or headed end 34, as seen in FIG. 4, which is located within the upper portion of the recess 20. Each wire projects generally laterally outwardly from an opening 34 in the body wall 22, then downwardly, and then laterally inwardly through a lower opening 36 in the wall 22. The free end of each wire 14 is reversely formed to extend back across the lower terminus of the wall 22 and is then entwined upon itself, as best seen in FIG. 5. The two wires 14 are diametrically opposed and are adapted upon rotation of the body 12 to clip grass located adjacent the periphery of the sprinkler head 26 over which the body 12 is located.

Differently configured cutter wires 14a are illustrated in FIG. 6 in a modified embodiment of clipper 10a. Each wire 14a projects outwardly of the body 12a to a progressively greater degree in an upward direction whereby the diameter of the grass area clipped by the wires 14a increases as the body 12a is moved downwardly relative to the sprinkler head 26.

In operation of either clipper embodiment, the usual reel (not shown) of the fish line lawn trimmer 18 is removed and the present clipper 10 is positioned upon the rotor 16, and rotated a quarter turn to lock it in position.

The body 12 is then disposed over the sprinkler head 26 with its inner lower wall portion located closely adjacent the circular periphery 24 of the head 26. This prevents the body 12 from moving or "skating" away from the head 26 during rotation of the rotor 16.

Upon rotation of the rotor 16 in the cutting position of the clipper 10, the lower end of the body wall 22 abrades any grass lying under it, and the outwardly projecting cutter wires 14 trim away the grass. In confined areas, such as where the sprinkler head 26 is located adjacent a sidewalk, the trimmer 18 is tilted so that the high side of the body 12 is next to the sidewalk, out of position to contact the sidewalk, whereby the low side of the body 12 can clip a generally semicircular grass pattern around the head 26.

The plastic material of which the body 12 is made facilitates relative circumferential sliding movement of the body 12 upon the sprinkler head 26 without damage to the head. This rotatable engagement is useful in maintaining the clipper 10 in proper position to clip a neat swath of grass around the periphery of the clipper sprinkler head.

Although the body 12 has been described as adapted for detachable mounting to the rotor 16, it is also envisioned that the bottom of the fish line reel (not shown) could be provided with locking means to detachably accept the body 12, if desired, in which case it would not be necessary to remove the fish-line reel before mounting the body 12 in operating position.

Various modifications and changes may be made with regard to the foregoing detailed description without departing from the spirit of the invention.

I claim:

1. A sprinkler head grass clipper for coupling to a lawn trimmer rotor rotatable about a vertical axis, said clipper comprising:
    a body adapted to fit over and engage a sprinkler head for maintaining said body in a predetermined clipping position during rotation of said rotor; and
    cutting means comprising an element of relatively small, substantially uniform cross section extending between the top and bottom portions of said body to project outwardly of said body and operative during said rotation in said clipping position to clip grass located adjacent the periphery of said sprinkler head.

2. A sprinkler head grass clipper according to claim 1 wherein said body is characterized by a depending skirt portion having a cylindrical inner surface for engagement with said sprinkler head in said clipping position.

3. A sprinkler head grass clipper according to claim 2 wherein said cutting means are carried by and project outwardly of said skirt portion.

4. A sprinkler head grass clipper according to claim 1 wherein said cutting means comprise a wire extending between the top and bottom portions of said body, and projecting outwardly of said body.

5. A sprinkler head grass clipper according to claim 4 wherein said wire is configured to project outwardly of said body to a progressively greater degree in an upward direction from the bottom to the top of said body whereby the diameter of the grass area clipped by said wire increases as said body is moved downwardly relative to said sprinkler head.

6. A sprinkler head grass clipper according to claim 1 wherein said lawn trimmer rotor includes first locking means and said body includes second locking means, said first and second locking means being operative to detachably mount said body to said rotor.

7. A sprinkler head grass clipper for mounting to a lawn trimmer rotor rotatable about a vertical axis, said clipper comprising;
    a body including a downwardly open recess defined by a cylindrical wall adapted to slidably bear against the periphery of a sprinkler head received within said recess whereby said body is maintained in a predetermined clipping position during rotation of said rotor; and
    cutting means carried by said body and comprising an element of relatively small, substantially uniform cross section extending between the top and bottom portions of said body to project outwardly of said body for clipping grass adjacent said periphery of said sprinkler head upon rotation of said rotor.

8. A sprinkler head grass clipper according to claim 7 wherein said cutting means comprise a wire extending between the top and bottom portions of said body, and projecting outwardly of said body.

9. A sprinkler head grass clipper according to claim 7 wherein said lawn trimmer rotor includes first locking means and said body includes second locking means, said first and second locking means being operative to detachably mount said body to said rotor.

10. A sprinkler head grass clipper according to claim 7 wherein said cutting means comprise a plurality of wire elements mounted to and projecting radially outwardly of said body.

* * * * *